Figure 1:
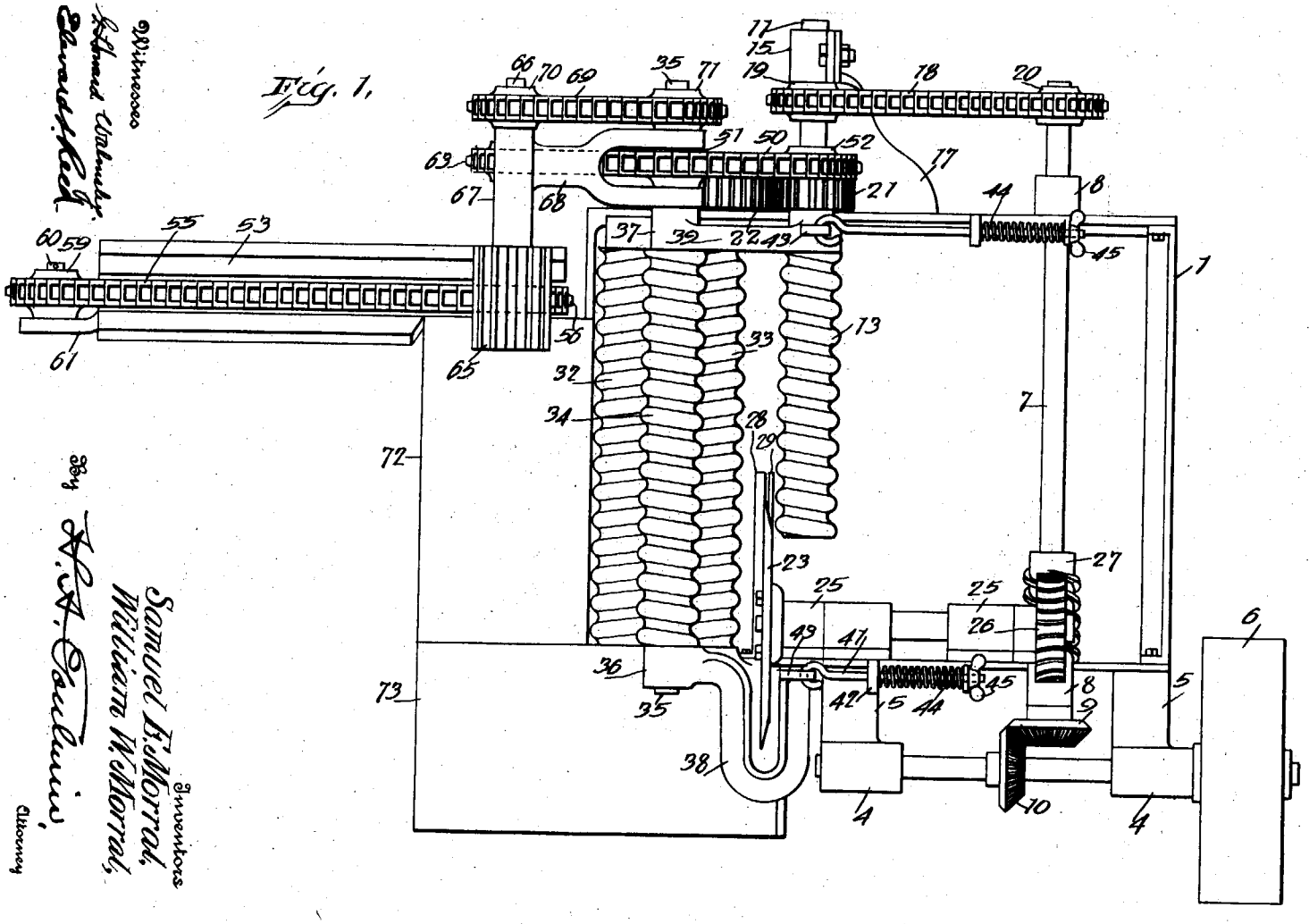

S. E. & W. W. MORRAL.

MACHINE FOR REMOVING THE BUTT ENDS OF EARS OF CORN.

APPLICATION FILED OCT. 20, 1910.

Reissued Feb. 14, 1911.

13,207.

4 SHEETS—SHEET 1.

Witnesses

G. Howard Walmsley.

Edward S. Reed

Inventors

Samuel E. Morral,

William W. Morral,

By H. A. Coulwin,

Attorney

THE NORRIS PETERS CO., WASHINGTON, D.

S. E. & W. W. MORRAL.

MACHINE FOR REMOVING THE BUTT ENDS OF EARS OF CORN.

APPLICATION FILED OCT. 20, 1910.

Reissued Feb. 14, 1911.

13,207.

4 SHEETS—SHEET 2.

Witnesses

G. Arnold Walmsley.

Edward L. Reed.

Inventors

Samuel E. Morral,

William W. Morral,

By H. A. Toulmin,

Attorney

THE NORRIS PETERS CO., WASHINGTON, D. C.

S. E. & W. W. MORRAL.

MACHINE FOR REMOVING THE BUTT ENDS OF EARS OF CORN.

APPLICATION FILED OCT. 20, 1910.

Reissued Feb. 14, 1911.

13,207.

4 SHEETS—SHEET 3.

Witnesses

G. Howard Walmsley

Edward J. Reid

Inventors

Samuel E. Morral,

William W. Morral,

By H. A. Toulmin,

Attorney

THE NORRIS PETERS CO., WASHINGTON, D. C.

S. E. & W. W. MORRAL.
MACHINE FOR REMOVING THE BUTT ENDS OF EARS OF CORN.
APPLICATION FILED OCT. 20, 1910.
Reissued Feb. 14, 1911.
13,207.
4 SHEETS—SHEET 4.
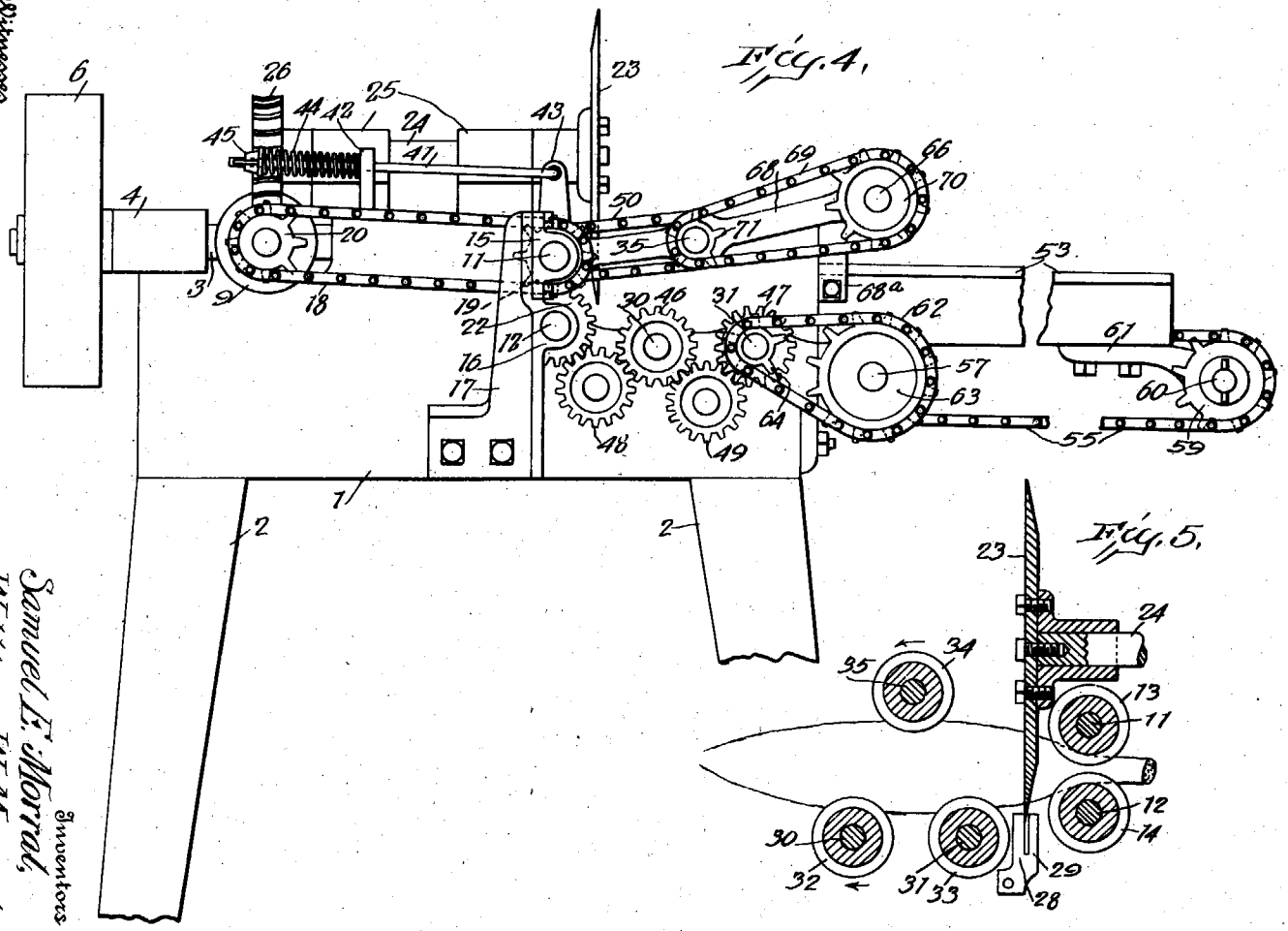
Witnesses
Howard Walmsley
Edward S. Reed
Inventors
Samuel E. Morral,
William W. Morral,
By H. A. Goulemin,
Attorney
THE NORRIS PETERS CO., WASHINGTON, D. C.

84

UNITED STATES PATENT OFFICE.

SAMUEL E. MORRAL AND WILLIAM W. MORRAL, OF MORRAL, OHIO.

MACHINE FOR REMOVING THE BUTT-ENDS OF EARS OF CORN.

13,207. Specification of Reissued Letters Patent. Reissued Feb. 14, 1911.

Original No. 907,842, dated December 29, 1908. Application for reissue filed December 28, 1909, Serial No. 535,376. Divided and this application for reissue filed October 20, 1910. Serial No. 588,310.

DIVISION B.

*To all whom it may concern:*

Be it known that we, SAMUEL E. MORRAL and WILLIAM W. MORRAL, citizens of the United States, residing at Morral, in the county of Marion and State of Ohio, have invented certain new and useful Improvements in Machines for Removing the Butt-Ends of Ears of Corn, of which the following is a specification.

This invention relates to machines for removing the butt-ends of ears of corn and is designed more particularly for operating upon green corn, such as is used in canning factories.

The present application is a division of the reissue application filed by us December 28, 1909, Serial Number 535,376, and the invention is in the nature of an improvement upon Patent No. 801,258, granted to us October 10, 1905, and the object of the same is to provide a machine of this character with a high degree of efficiency, both as to the character of the work done and as to the speed with which the ears of corn are handled.

To this end it is a further object of the invention to provide a machine of this character with a support to maintain an ear of corn in a substantially horizontal position, a guide to properly position the ear relatively to the butt-removing device, positively operated means for holding the ear in engagement with the guide, and means for moving the ear along the guide toward the butt-removing device.

Figure 2:
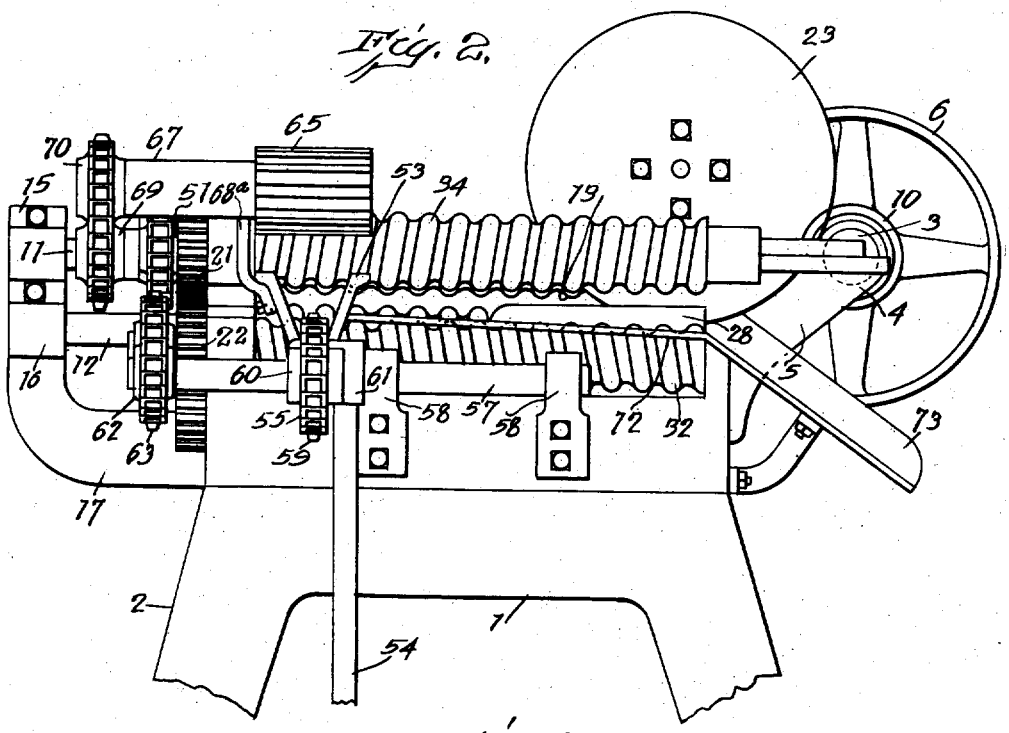
Figure 6:
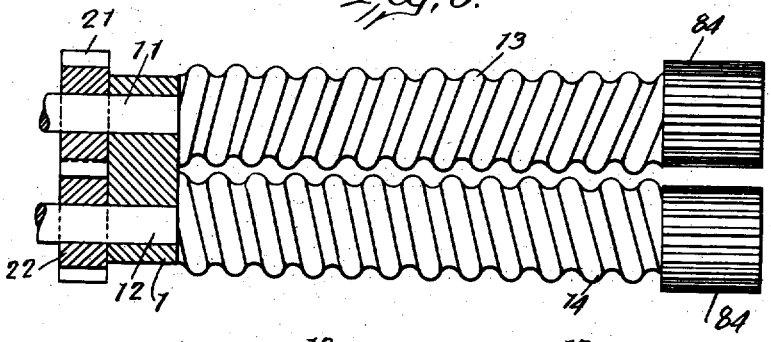
Figure 7:
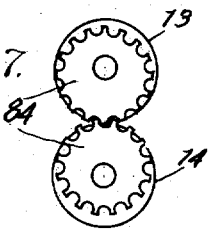
Figure 8:
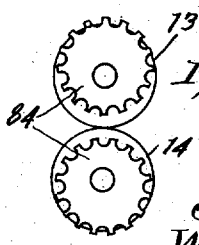
Figure 3:
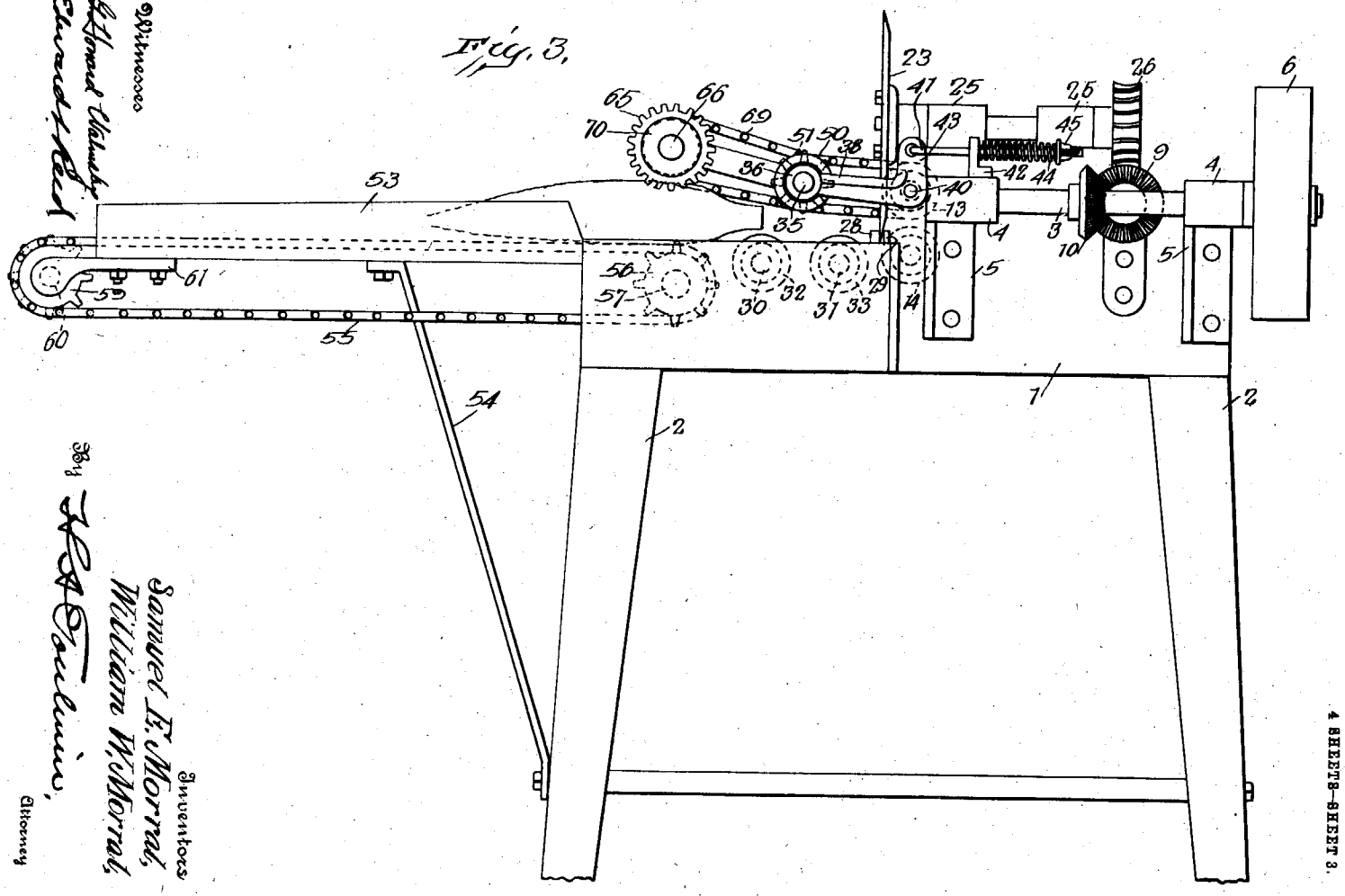

In the accompanying drawings, Figure 1 is a top plan view of a machine embodying our invention; Fig. 2 is an end elevation of the same; Fig. 3 is a side elevation thereof; Fig. 4 is an elevation of the side opposite that shown in Fig. 3; Fig. 5 is a detail sectional view of the cutting mechanism, together with the gaging and holding rollers; Fig. 6 is a detail view of a modified form of gaging rollers; and Figs. 7 and 8 are end views of the gaging rollers shown in Fig. 6.

In these drawings we have illustrated one embodiment of our invention and have shown the same as comprising a main frame 1, preferably substantially rectangular in shape and mounted upon suitable standards or supports 2. A drive shaft 3 extends longitudinally to this frame and is mounted in suitable bearings 4 carried by brackets 5 which are secured to the side of the frame 1. This shaft may be rotated by any suitable means and is here shown as provided with a driving pulley 6 on the outer end thereof. A second shaft 7 extends transversely to the frame 1 and is mounted in suitable bearings 8 carried on the opposite sides of said frame. This shaft is provided on the end adjacent to the shaft 3 with a beveled pinion 9 adapted to mesh with a similar pinion 10 carried by said shaft 3.

Mounted in the main frame 1 and extending transversely thereto are suitable guides, such as gaging rollers, having their adjacent sides spaced apart a distance sufficient to admit the stem or tapered portion of the butt-end of the ear of corn, but not sufficient to permit the passage of the ear of corn, thus limiting the longitudinal movement of the ear of corn and causing the same to be presented to the cutter in the proper position. In the form here shown, these gaging rollers comprise a pair of parallel shafts 11 and 12 arranged in substantially the same vertical plane, journaled in one of the side members of the main frame and extending inwardly therefrom to a point near the opposite side member.

Mounted on or secured to the shafts 11 and 12 are suitable feed screws 13 and 14 having right and left hand threads, respectively, adapted to be rotated in opposite directions, whereby those portions of the threads on the adjacent sides of the two gaging rollers move in the same direction and tend to carry the ear of corn, the end of which is in engagement therewith, longitudinally to said rollers.

The gaging rollers may be rotated in opposite directions in any suitable manner, but we have here shown the shafts 11 and 12 as extending for some distance beyond the outer side of the main frame 1 and having their outer ends supported in suitable bearings 15 and 16 formed in a bracket 17 secured to the side of the main frame 1. The upper shaft 11 is here shown as rotated by a sprocket chain 18 which extends about a sprocket wheel 19, secured to the outer end of the shaft 11, and a similar sprocket wheel 20 secured to the corresponding end of the shaft 7. A pinion 21 mounted on the shaft 11 meshes with a corresponding pinion 22 carried by the shaft 12 and serves to rotate the shaft 12 at a uniform speed with the shaft 11, but in the opposite direction.

A suitable butt-removing device is mounted near the free or discharge ends of the gaging rollers and is adapted to engage the ears of corn as the same are fed longitudinally to said gaging rollers and remove the butt-ends thereof. This device is here shown as comprising a cutter disk 23, which is rigidly secured to one end of a shaft 24 which is journaled in suitable bearings 25 secured to the side member of the frame 1 and provided near the end opposite that to which the cutter disk 23 is secured with a worm wheel 26 adapted to mesh with a worm 27 secured to the shaft 7, whereby a rotary movement is imparted to the disk 23. Suitable shearer bars 28 and 29 are supported from the side member of the frame 1 beneath the cutter disk 23 and coöperate therewith. These shearer bars, which are preferably two in number, are supported on opposite sides of the cutter disk and support both the body and the butt of the ear during the cutting operation, thereby enabling the cutter to make a clean smooth cut. The cutter disk 23 preferably extends some distance beyond the free or discharge end of the gaging rollers, whereby the ear of corn is engaged and the butt severed therefrom before the ear has passed the end of the gaging rollers. Suitable means are provided for supporting an ear of corn in a position to engage said guide and to be operated upon by said cutter, for holding said ear of corn in engagement with said guides, and for feeding said ear of corn along said guides toward said cutter. In the present machine the supporting means and the holding means comprise a plurality of rollers, the lower rollers serving as a support for the ear and the upper roller acting to hold the ear against the guides while it is being moved toward the butt-removing device by suitable feeding devices. The lower or supporting rollers are, as here shown, positively rotated and assist in holding the ear against the guides, but this is not necessary to the successful operation of the machine, as the upper or holding roller coöperating with a support of any kind will hold the ear against the guides while it is being moved along the guides by any suitable means. In the present machine the supporting and holding rollers are provided with feeding means to move the ear along the guides and, therefore, the holding and supporting rollers also constitute feeding rollers which engage the ear between them, move it along the guide and hold it against the guide. To this end these rollers comprise a pair of parallel shafts 30 and 31 journaled at their opposite ends in the side members of the frame 1 and lying in substantially the same horizontal plane, which horizontal plane is slightly lower than that in which the shaft 12 of the lower gaging roller is located. Formed on or secured to the shafts 30 and 31 are rollers provided with feed screws having their threads turned in the same direction and in a direction corresponding to that of the lower gaging roller 14. These rollers and their screws form feeding rollers 32 and 33. A vertically movable feeding roller 34 is mounted above the feeding rollers 32 and 33 and preferably in a vertical plane lying between the vertical planes of the axes of said feeding rollers. This feeding roller preferably comprises a shaft 35 journaled in bearings 36 and 37 formed in the ends of arms 38 and 39, which are pivotally supported on the main frame, the arm 38 being mounted on a suitable stud shaft or pivot pin 40 secured to the side of the main frame 1, and the arm 39 being journaled on the shaft 11 of the upper gaging roller 13. The feed roller proper is mounted on or secured to the shaft 35 between the bearings 36 and 37 and consists of a roller provided with a screw having its thread turned in a direction opposite to that in which the threads of the lower rollers 32 and 33 are turned and corresponding to the direction in which the thread of the upper gaging roller 13 is turned. We also prefer to provide suitable means for holding the upper roller 34 in its proper position. These means are here shown as comprising rods 41 extending through suitable guides 42 carried by the main frame and secured at one end to upwardly extending lugs or arms 43 carried by the arms 38 and 39. A spring 44 is coiled about that end of each rod 41 lying beyond the apertured lug 42 and is confined between said apertured lug and a suitable stop on the outer end of the rod, such as a thumb nut 45. The tension of these springs is such as to counterbalance the upper feeding roller 34 and permit the same to engage the ears of corn without exerting too great a pressure thereon.

The rollers may be rotated in any suitable manner. In the present instance we have shown the shafts 30 and 31 of the rollers 32 and 33 as provided with gears 46 and 47, the gear 46 being actuated from the gear 22 on the shaft 12 by means of an intermediate gear 48, while the gear 47 is actuated from the gear 46 by means of an intermediate gear 49, the relation of the several gears being such as to cause the lower rollers 32 and 33 and the lower gaging roller 14 to be rotated in the same direction at a uniform rate of speed. The upper feeding roller 34 is preferably rotated by means of a sprocket chain 50 extending about a sprocket wheel 51 secured to the shaft 35 and a similar sprocket wheel 52 secured to the shaft 11 of the upper gaging roller 13, thus causing the upper feeding roller 34 and the upper gaging roller 13 to be rotated in the same direction and at a uniform rate of speed.

A feed trough 53 extends at substantially right angles to the feeding rollers and is supported in a substantially horizontal position by means of a brace 54. A suitable conveyer belt extends longitudinally of the trough 53 and, as here shown, comprises a sprocket chain 55 extending about a sprocket wheel 56 located at one end of the trough 53 and mounted on a shaft 57 which is journaled in suitable bearings 58 secured to the main frame. At the opposite end of the trough 53 the sprocket chain 55 extends about a similar sprocket wheel 59 mounted on a suitable stud shaft 60 carried by a bracket 61, which is supported on the outer end of the trough 53. The shaft 57 preferably extends beyond the sprocket wheel 56 and is adapted to be rotated by means of a sprocket chain 62 extending about a sprocket wheel 63 secured to the outer end of said shaft and about a sprocket wheel 64 mounted on the outer end of the shaft 31 of one of the feeding rollers. A short corrugated feeding roller 65 extends transversely to the trough 53 near the inner end thereof and is capable of vertical movement, whereby the same is adapted to rest upon the ears of corn as they are fed longitudinally to the trough 53 by the feed belt and to accommodate itself to ears of corn of different sizes. The corrugated feed roller 65 is preferably mounted upon a shaft 66 journaled in a bearing 67 formed in the outer end of an arm 68, the opposite end of which is journaled upon the shaft 35 of the vertically movable feeding roller 34. A stop or bracket 68[a], mounted on the trough 53, extends upwardly to a point beneath the arm 68 and is adapted to engage said arm to limit its downward movement. The shaft 66 also receives its rotary movement from the shaft 35 by means of a sprocket chain 69 extending about similar sprocket wheels 70 and 71 mounted on the shafts 66 and 35, respectively.

In the operation of the machine as thus described, the ears of corn are placed in the feed trough 53 with their butt-ends foremost, and, as they are carried inwardly by the feeding belt 55, they are engaged by the corrugated feed roller 65 and forced between the lower feeding rollers 32 and 33 and the vertically movable upper roller 34, the direction of rotation of these rollers being such as to move the ear of corn transversely thereto and longitudinally to the frame 1 until the butt-end thereof comes into engagement with the gaging rollers 13 and 14, the feeding rollers 32 and 33 being located in a slightly lower plane than the lower gaging roller 14, thus permitting the stem or tapered portion of the butt to extend between the two gaging rollers. As stated, the gaging rollers 13 and 14 are spaced apart a distance sufficient to permit the stem or small end of the butt of the ear of corn to enter between the same, but the space between the rollers is not sufficient to permit the ear of corn itself to enter, and, as these rollers have no vertical movement, they form an efficient stop to prevent the further movement of the ear of corn in a direction transversely to the length of the several rollers. The feed screws on the feeding rollers serve to convey the ear of corn longitudinally thereto while it is being held in engagement with the gaging rollers, and the feeding screws on the gaging rollers, which are rotated in the same direction as the feeding rollers, facilitate this longitudinal movement of the ear of corn. As the ear approaches the discharge end of the roller it comes into engagement with the cutter 23, which is so located relatively to the gaging rollers as to engage the ear at such a point as to sever the stem and butt-end of the ear of corn, thereby removing the butt-end of the ear and loosening the husks on the ear so that the same are readily removed by the husking machine, to which the ear of corn is fed after it leaves the machine for cutting off the butt-end thereof. As the butt-end of the ear of corn is severed, it is discharged from the gaging rollers and drops downwardly through the frame where it may be disposed of in any suitable manner, the ear of corn itself being carried to the discharge end of the feeding rollers, where it is dropped upon a suitable table 72 provided with a downwardly inclined portion 73 which serves to discharge the ear of corn into a suitable receptacle or conveyer.

It will be apparent that various means may be employed for removing the butt-ends of the ears, and, in Figs. 6 to 8 of the drawings, we have illustrated another form of device for accomplishing this. As shown in those figures, the gaging rollers 13 and 14 are provided at their outer edges with snapping rollers, which, in the present instance, are corrugated rollers 84 eccentrically mounted on the ends of the gaging rollers and so arranged relatively to the spiral groove in said gaging rollers as to receive the end of the ear between the same when it is discharged from the gaging rollers, the continued rotation of the gaging rollers and the snapping rollers serving to pinch or snap off the butt-end of the ear. When the snapping rollers or similar devices are employed, the cutting mechanism 23 is dispensed with.

From the foregoing description it will be apparent that we have provided a machine of the character described, in which the ears of corn will be maintained in a horizontal position, will be positively fed to the cutter and will be moved into a proper position relatively to the cutter and held in that position, the construction and operation of the machine being such that the work is accurately performed, a uniform portion of the butt-end of each ear of corn being cut away; and further, that the machine is capable of being operated at a high rate of speed and the ears of corn fed to the same in rapid succession, thus providing a machine having a high degree of efficiency both in the character of the work performed and in the speed with which the ears of corn are handled. It will further be apparent that our machine, in its essential characteristics, comprises a butt-removing device, a guide leading to said butt-removing device, a support for an ear of corn, means for holding said ear of corn against said guide, and means for feeding the ear of corn along said guide. These features of construction are capable of wide modification and we, therefore, wish it to be understood that we do not desire to be limited to the details of construction shown and described, for obvious modifications will occur to a person skilled in the art.

Having thus fully described our invention, what we claim as new and desire to secure by Letters Patent, is:—

1. In a machine of the character described, the combination, with gaging rollers, and a butt-removing device operatively supported near the discharge end thereof, of rollers for holding an ear of corn against said gaging rollers, and means carried by the last-mentioned rollers for conveying said ear of corn longitudinally thereto.

2. In a machine of the character described, the combination, with gaging rollers having coöperating feeding screws, and a butt-removing device operatively supported near the discharge end thereof, of means for moving said ear of corn toward said gaging rollers and for feeding the same longitudinally thereto.

3. In a machine of the character described, the combination, with gaging rollers having coöperating feeding screws, and a butt-removing device operatively supported near the discharge end thereof, of rollers adapted to hold an ear of corn against said gaging rollers and to feed the same longitudinally thereto.

4. In a machine of the character described, the combination, with gaging rollers having coöperating feeding screws, and a butt-removing device operatively supported near the discharge end thereof, of rollers for holding an ear of corn against said gaging rollers and having feeding screws to feed the ear longitudinally to said gaging rollers.

5. In a machine of the character described, the combination, with gaging rollers, and a butt-removing device operatively supported near the discharge end thereof, of rollers for holding an ear against said gaging rollers, provided with means for feeding the same longitudinally thereto and comprising a plurality of rollers, one of which rollers is movable relatively to another of said rollers.

6. In a machine of the character described, the combination, with gaging rollers having coöperating feed screws, and a butt-removing device operatively supported near the discharge end thereof, of rollers extending substantially parallel to said gaging rollers and having feed screws, and means for rotating all of said rollers.

7. In a machine of the character described, the combination, with gaging rollers having coöperating feed screws, and a butt-removing device operatively supported near the discharge end thereof, of feeding rollers having coöperating feed screws corresponding to the feed screws of said gaging rollers, one of said feeding rollers being movably mounted relatively to another of said feeding rollers, and means for actuating said rollers.

8. In a machine of the character described, the combination, with gaging rollers located one above the other and having coöperating feed screws, and a butt-removing device operatively supported near the discharge end thereof, of feeding rollers comprising a pair of rollers mounted in substantially the same horizontal plane, a third roller movably mounted above the first-mentioned feeding rollers and between the vertical planes of the axes thereof, means for rotating said rollers, and means carried by said rollers for moving an ear of corn longitudinally thereto.

9. In a machine of the character described, the combination, with gaging rollers located one above the other, and a butt-removing device operatively supported near the discharge end thereof, of feeding rollers comprising a pair of rollers mounted in substantially the same horizontal plane, a third roller movably mounted above the first-mentioned feeding rollers and between the vertical planes of the axes thereof, means for rotating said rollers, and means carried by said rollers for moving an ear of corn longitudinally thereto.

10. In a machine of the character described, the combination, with gaging rollers mounted one above the other and having coöperating feed screws, and a butt-removing device operatively supported near the discharge end of said gaging rollers, of feeding rollers comprising a pair of rollers located in substantially the same horizontal plane and each having a feed screw, a vertically movable roller mounted above the first-mentioned feeding rollers, between the vertical planes of the axes thereof, and having a feed screw to coöperate with the feed screw of the lower rollers, and means for rotating said rollers.

11. In a machine of the character described, the combination, with gaging rollers, and a butt-removing device operatively supported near the discharge end thereof, of feeding rollers extending substantially parallel to said gaging rollers, adapted to hold an ear of corn in engagement with said gaging rollers and having feed screws to feed said ear of corn longitudinally to said rollers, a feed trough extending at substantially right angles to said feeding rollers, and means for conveying an ear of corn longitudinally to said trough and into engagement with said feeding rollers.

12. In a machine of the character described, the combination, with gaging rollers, and a butt-removing device operatively supported near the discharge end thereof, of feeding rollers extending substantially parallel to said gaging rollers, adapted to hold an ear of corn in engagement with said gaging rollers and having feed screws to feed said ear of corn longitudinally to said rollers, a feed trough extending at substantially right angles to said feeding rollers, a conveyer moving longitudinally to said trough, and a positively rotated roller mounted above said feed trough and adapted to engage the ears of corn and move the same into engagement with said feeding rollers.

13. In a machine of the character described, the combination, with a guide, and a butt-removing device arranged near the discharge end of said guide, of feeding rollers adapted to hold an ear of corn against said guide and to feed the same longitudinally thereto.

14. In a machine of the character described, the combination, with a guide, and a butt-removing device arranged near the discharge end of said guide, of rollers adapted to hold an ear of corn against said guide and having feed screws to feed said ear longitudinally to said guide.

15. In a machine of the character described, the combination, with a guide, and a butt-removing device arranged near the discharge end of said guide, of rollers for holding an ear of corn against said guide, provided with means for feeding the same longitudinally thereto and comprising a plurality of rollers, one of which is movable relatively to another thereof.

16. In a machine of the character described, the combination, with a guide, and a butt-removing device arranged near the discharge end of said guide, of rollers for holding an ear of corn against said guide, said rollers having coöperating feed screws to feed the ear of corn longitudinally thereto and one of said rollers being movable relatively to another thereof.

17. In a machine of the character described, the combination, with a guide, and a butt-removing device arranged near the discharge end of said guide, of feeding rollers comprising a pair of rollers mounted in substantially the same horizontal plane, a third roller mounted immediately above the first-mentioned feeding rollers and between the vertical planes of the axes thereof and having means for moving an ear of corn longitudinally thereto.

18. In a machine of the character described, the combination, with a guide, and a butt-removing device arranged near the discharge end of said guide, of feeding rollers comprising a pair of rollers mounted in substantially the same horizontal plane and having corresponding feed screws, a third roller movably mounted above the first-mentioned feeding rollers and between the vertical planes of the axes thereof and having a feed screw to coöperate with the feed screws of the first-mentioned rollers.

19. In a machine of the character described, the combination with gaging rollers having coöperating feeding screws, and a butt-removing device operatively supported near the discharge end thereof, of means for moving an ear of corn toward said gaging rollers and holding the same in engagement therewith.

20. In a machine of the character described, the combination, with gaging rollers having coöperating feeding screws, a butt-removing device operatively supported near said gaging rollers, and a support for an ear of corn, of means coöperating with said support to move an ear of corn toward said gaging rollers and hold the same in engagement therewith.

In testimony whereof we affix our signatures in the presence of two witnesses.

SAMUEL E. MORRAL.
WILLIAM W. MORRAL.

Witnesses:
S. M. Stouffer,
C. J. Schultz.